US009819417B2

(12) United States Patent
Chung et al.

(10) Patent No.: US 9,819,417 B2
(45) Date of Patent: Nov. 14, 2017

(54) METHOD AND APPARATUS FOR GENERATING OPTICAL POLAR RETURN-TO-ZERO AMPLITUDE MODULATION SIGNAL USING REFLECTIVE SEMICONDUCTOR OPTICAL AMPLIFIER AND WAVELENGTH-DIVISION-MULTIPLEXED PASSIVE OPTICAL NETWORK SYSTEM USING THE SAME

(71) Applicant: Korea Advanced Institute of Science and Technology, Daejeon (KR)

(72) Inventors: Yun Chur Chung, Daejeon (KR); Hyun Kyu Shim, Daejeon (KR); Hoon Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/993,508

(22) Filed: Jan. 12, 2016

(65) Prior Publication Data

US 2016/0204872 A1    Jul. 14, 2016

(51) Int. Cl.
*H04B 10/516*    (2013.01)
*H04J 14/02*    (2006.01)
*H04B 10/54*    (2013.01)

(52) U.S. Cl.
CPC ..... *H04B 10/5162* (2013.01); *H04B 10/5167* (2013.01); *H04B 10/541* (2013.01); *H04J 14/0282* (2013.01)

(58) Field of Classification Search
CPC .............. H04B 10/504; H04B 10/5162; H04B 10/5167; H04B 2210/517
See application file for complete search history.

(56) References Cited

U.S. PATENT DOCUMENTS

| 7,110,681 B1 * | 9/2006 | Mizuochi ............. H04B 10/505 341/53 |
| 2008/0187314 A1 * | 8/2008 | Chung ............... H04B 10/2587 398/72 |
| 2009/0196612 A1 * | 8/2009 | Lee ...................... H04B 10/503 398/72 |

FOREIGN PATENT DOCUMENTS

| KR | 10-2006-0042486 A | 5/2006 |
| KR | 10-2008-0073446 A | 8/2008 |
| KR | 10-2011-0064352 A | 6/2011 |

OTHER PUBLICATIONS

Zhao et al, Mitigation of Pattern Sensitivity in Full-Field Electronic Dispersion Compensation (published in IEEE Photonics Technology Letters, vol. 21, No. 1, Jan. 1, 2009).*

(Continued)

*Primary Examiner* — David Payne
*Assistant Examiner* — Casey Kretzer
(74) *Attorney, Agent, or Firm* — The PL Law Group, PLLC

(57) ABSTRACT

The present invention can operate a reflective semiconductor optical amplifier at ultrahigh speed using a polar return-to-zero (RZ) modulation method, and operate a reflective semiconductor optical amplifier (RSOA) whose modulation bandwidth is limited at ultrahigh speed by generating signals vertically symmetrical using a newly suggested polar RZ signal generator when generating an amplitude modulation signal at a transmission end. The present invention can overcome the problem that a modulation speed cannot be increased to 10 Gb/s or above due to signal distortion by inter-symbol-interference when generating an ultrahigh speed amplitude modulation signal using an RSOA of low price having a very narrow modulation bandwidth in an RSOA-based optical network. Also, the present invention has an effect of receiving the generated amplitude modula- (Continued)

tion signal through a direct detection receiver which is cost-effective and simple, and further has an effect of enabling ultrahigh speed operation of the RSOA-based WDM PON.

10 Claims, 6 Drawing Sheets

(56) References Cited

OTHER PUBLICATIONS

Office action issued on Jun. 28, 2017 from Korea Patent Office in a counterpart Korean Patent Application No. 10-2015-0174236 (all the cited references are listed in this IDS).

* cited by examiner

METHOD AND APPARATUS FOR GENERATING OPTICAL POLAR RETURN-TO-ZERO AMPLITUDE MODULATION SIGNAL USING REFLECTIVE SEMICONDUCTOR OPTICAL AMPLIFIER AND WAVELENGTH-DIVISION-MULTIPLEXED PASSIVE OPTICAL NETWORK SYSTEM USING THE SAME

CROSS REFERENCE TO RELATED APPLICATION

This application claims priority to and the benefit of Korean Patent Application Nos. 10-2015-0004302 filed on Jan. 12, 2015, and 10-2015-0174236 filed on Dec. 8, 2015 in the Korean Intellectual Property Office, the entire contents of which are incorporated herein by reference.

BACKGROUND

Technical Field

The present invention relates to a method and an apparatus for generating an optical polar return-to-zero (RZ) amplitude modulation signal using a reflective semiconductor optical amplifier, and a wavelength-division-multiplexed passive optical network system using the same. Particularly, the present invention relates to a method and an apparatus for operating a reflective semiconductor optical amplifier whose modulation bandwidth is limited at ultrahigh speed using a polar RZ modulation method.

Background Art

Recently, as the demand for various data services including the Internet is constantly on an increase, a demand for ultrahigh speed optical network is continuously on an increase. As a means to cope with this demand, a wavelength-division-multiplexed passive optical network (WDM PON) is drawing attention. However, since the WDM PON structurally requires a light source having an individual wavelength for each subscriber, it has not been widely used due to the complexity in managing the network and economic issues, etc. In order to solve these problems, a method centering the light source of a specific wavelength on the central office, and installing a colorless light source that can operate at any wavelength at the subscriber end has been suggested. In this case, since all light sources installed at the subscriber end can be implemented as a light source of the same type, the complexity in operating the WDM PON can be relieved, and the light source at the subscriber end can be implemented economically. Recently, a reflective semiconductor optical amplifier (RSOA) is taking center stage as a colorless light source. The RSOA-based wavelength-division-multiplexed passive optical network has a structure transmitting a seed light of a specific wavelength from the central office (CO) to the RSOA located in each optical network unit (ONU), directly modulating the seed light based on a signal using the RSOA at the subscriber end to form an upstream signal, and then transmitting it to the optical receiver located in the central office.

However, since the modulation bandwidth of the RSOA is generally limited to 3 GHz or below, there is a lot of difficulty in increasing the transmission speed per channel of WDM PON to a level of 10 Gb/s or above.

In order for ultrahigh speed operation of the RSOA-based WDM PON, a method for generating a quadrature phase shift keying (QPSK) signal by directly modulating a seed light based on a signal using RSOA and receiving this with the coherent receiver has been reported.

However, since the coherent receiver is too expensive to be applied to an optical access network where cost-effectiveness is important, in order to improve the cost-effectiveness of the network, preferably, the RSOA transmits signals using intensity information, and the optical receiver located at the CO uses a direct detection method.

However, the system using this direct detection method still has disadvantages that the transmission speed per channel is limited by the limited modulation bandwidth of RSOA. For example, a method for increasing the transmission speed per channel of RSOA-based WDM PON, which uses a multi-level amplitude modulation method such as the existing 4-ary pulse amplitude modulation (4-PAM), has been reported, but even in this method, the transmission speed per channel is restricted to 10 Gb/s or below. Thus, in order to provide an ultrahigh speed service of at least 10 Gb/s to each subscriber, and implement an cost-effective RSOA-based WDM PON using the direct detection method, it is necessary to develop a new amplitude modulation method.

SUMMARY

The present invention was suggested to solve the above problems of conventional art. The purpose of the polar RZ modulation method according to the present invention is to provide a cost-effective system for generating an ultrahigh speed amplitude modulation signal of at least 10 Gb/s by using bandwidth-limited RSOAs and cost-effective direct-detection receivers.

The method of the present invention which aims to solve the above technical problems characterized by generating a high-speed amplitude modulation signal of at least 10 Gb/s per channel by directly modulating a seed light based on a signal using RSOA in the WDM PON, which uses RSOA as a light source of a upstream signal in an optical network unit (ONU) and uses a direct detection receiver in a central office (CO).

The method of the present invention which aims to solve the above technical problem is an ultrahigh speed WDM PON including a central office, a remote node and a plurality of optical network units. Specifically, the present invention relates to a method for high-speed operation of WDM PON including a central office transmitting downstream optical signals and a seed light for generating upstream optical signal to each optical network unit, and receiving the upstream optical signal transmitted from each optical network unit with a direct detection receiver; an optical network unit amplifying/modulating the seed light based on a signal using a reflective modulation device such as a reflective semiconductor optical amplifier, etc. located in each optical network unit and transmitting the amplified/modulated seed light to a remote node; and the remote node demultiplexing the downstream optical signals and transmitting them to each optical network unit, multiplexing the upstream optical signals transmitted from the optical network units and transmitting them to the central office. Particularly, the present invention relates to a modulation method for generating an ultrahigh speed upstream signal using RSOA whose modulation bandwidth is limited.

In order to achieve the above technical subject matter, the present invention is characterized in that a polar RZ signal can be generated by using two non-return-to-zero (NRZ) to RZ converters (NRZ-to-RZ converters) and a balun, and that the generated polar RZ signal has a vertically symmetric structure.

The method for generating an optical polar RZ amplitude modulation signal according to an embodiment of the present invention includes generating an electrical polar RZ amplitude modulation signal using a polar RZ amplitude modulation signal generator; and generating an optical polar RZ amplitude modulation signal by applying the electrical polar RZ amplitude modulation signal to a reflective semiconductor optical amplifier.

With regard to the method for generating an optical polar RZ amplitude modulation signal according to an embodiment of the present invention, the amplitude modulation signal may be a multi-level signal.

With regard to the method for generating an optical polar RZ amplitude modulation signal according to an embodiment of the present invention, the step of generating an electrical polar RZ amplitude modulation signal may include generating a polar RZ signal using a polar RZ signal generator; and generating the electrical polar RZ amplitude modulation signal by converting the polar RZ signal into a multi-level amplitude modulation signal using a multi-level amplitude modulation signal generator.

With regard to the method for generating an optical polar RZ amplitude modulation signal according to an embodiment of the present invention, the step of generating a polar RZ signal using the polar RZ signal generator may include generating an NRZ electrical signal and a complementary signal of the NRZ electrical signal using a pulse pattern generator; converting the NRZ electrical signal and the complementary signal of the NRZ electrical signal into a first RZ signal and a second RZ signal using a first NRZ-to-RZ converter and a second NRZ-to-RZ converter; inverting the first RZ signal using a balun; and generating the polar RZ signal by combining the inverted first RZ signal and the second RZ signal using a first power combiner.

With regard to the method for generating an optical polar RZ amplitude modulation signal according to an embodiment of the present invention, the step of generating the electrical polar RZ amplitude modulation signal by converting the polar RZ signal into a multi-level amplitude modulation signal using the multi-level amplitude modulation signal generator may include splitting the polar RZ signal generated by the polar RZ signal generator into a first polar RZ signal and a second polar RZ signal using a power splitter; delaying the first polar RZ signal using a delay line; attenuating the second polar RZ signal using an attenuator; and generating the electrical polar RZ amplitude modulation signal by combining the delayed first polar RZ signal and the attenuated second polar RZ signal using a second power combiner.

The apparatus for generating an optical polar RZ amplitude modulation signal according to an embodiment of the present invention includes a polar RZ amplitude modulation signal generator generating an electrical polar RZ amplitude modulation signal; and a reflective semiconductor optical amplifier generating an optical polar RZ amplitude modulation signal based on the electrical polar RZ amplitude modulation signal.

With regard to the apparatus for generating an optical polar RZ amplitude modulation signal according to an embodiment of the present invention, the amplitude modulation signal may be a multi-level signal.

With regard to the apparatus for generating an optical polar RZ amplitude modulation signal according to an embodiment of the present invention, the polar RZ amplitude modulation signal generator may include a polar RZ signal generator generating a polar RZ signal and providing the polar RZ signal to the reflective semiconductor optical amplifier as the electrical polar RZ amplitude modulation signal.

With regard to the apparatus for generating an optical polar RZ amplitude modulation signal according to an embodiment of the present invention, the polar RZ signal generator may include a pulse pattern generator generating an NRZ electrical signal and a complementary signal of the NRZ electrical signal; a first NRZ-to-RZ converter and a second NRZ-to-RZ convertor converting the NRZ electrical signal and the complementary signal of the NRZ electrical signal into a first RZ signal and a second RZ signal; a balun reversing the first RZ signal; and a first power combiner generating the polar RZ signal by combining the reversed first RZ signal and the second RZ signal.

With regard to the apparatus for generating an optical polar RZ amplitude modulation signal according to an embodiment of the present invention, the polar RZ amplitude modulation signal generator may further include a multi-level amplitude modulation signal generator generating the electrical polar RZ amplitude modulation signal by converting the polar RZ signal output from the polar RZ signal generator into a multi-level amplitude modulation signal.

With regard to the apparatus for generating an optical polar RZ amplitude modulation signal according to an embodiment of the present invention, the multi-level amplitude modulation signal generator may include a power splitter splitting the polar RZ signal generated by the polar RZ signal generator into a first polar RZ signal and a second polar RZ signal; a delay line delaying the first polar RZ signal; an attenuator attenuating the second polar RZ signal; and a second power combiner generating the electrical polar RZ amplitude modulation signal by combining the delayed first polar RZ signal and the attenuated second polar RZ signal.

The wavelength-division-multiplexed passive optical network (WDM PON) system according to an embodiment of the present invention includes a central office multiplexing and transmitting downstream optical signals having different wavelengths and receiving and demultiplexing upstream optical signals having different wavelengths; a remote node receiving the downstream optical signals from the central office and transmitting them to each optical network unit by demultiplexing them for each wavelength, and receiving and multiplexing the upstream optical signals having different wavelengths from said each optical network unit and transmitting them to the central office; and the optical network unit receiving the downstream optical signal from the remote node and transmitting the upstream optical signal to the remote node, wherein the optical network unit generates an optical polar RZ amplitude modulation signal vertically symmetric as the upstream optical signal.

With regard to the wavelength-division-multiplexed passive optical network (WDM PON) system according to an embodiment of the present invention, the amplitude modulation signal may be a multi-level signal.

With regard to the wavelength-division-multiplexed passive optical network (WDM PON) system according to an embodiment of the present invention, the optical network unit may include a polar RZ amplitude modulation signal generator generating an electrical polar RZ amplitude modulation signal; and a reflective semiconductor optical amplifier generating the optical polar RZ amplitude modulation signal based on the electrical polar RZ amplitude modulation signal.

With regard to the wavelength-division-multiplexed passive optical network (WDM PON) system according to an embodiment of the present invention, the polar RZ amplitude modulation signal generator may include a polar RZ signal generator generating a polar RZ signal and providing the polar RZ signal to the reflective semiconductor optical amplifier as the electrical polar RZ amplitude modulation signal.

With regard to the wavelength-division-multiplexed passive optical network (WDM PON) system according to an embodiment of the present invention, the polar RZ signal generator may include a pulse pattern generator generating an NRZ electrical signal and a complementary signal of the NRZ electrical signal; a first NRZ-to-RZ converter and a second NRZ-to-RZ convertor converting the NRZ electrical signal and the complementary signal of the NRZ electrical signal into a first RZ signal and a second RZ signal; a balun reversing the first RZ signal; and a first power combiner generating the polar RZ signal by combining the reversed first RZ signal and the second RZ signal.

With regard to the wavelength-division-multiplexed passive optical network (WDM PON) system according to an embodiment of the present invention, the polar RZ amplitude modulation signal generator may further include a multi-level amplitude modulation signal generator generating the electrical polar RZ amplitude modulation signal by converting the polar RZ signal output from the polar RZ signal generator into a multi-level amplitude modulation signal.

With regard to the wavelength-division-multiplexed passive optical network (WDM PON) system according to an embodiment of the present invention, the multi-level amplitude modulation signal generator may include a power splitter splitting the polar RZ signal generated by the polar RZ signal generator into a first polar RZ signal and a second polar RZ signal; a delay line delaying the first polar RZ signal; an attenuator attenuating the second polar RZ signal; and a second power combiner generating the electrical polar RZ amplitude modulation signal by combining the delayed first polar RZ signal and the attenuated second polar RZ signal.

With regard to the wavelength-division-multiplexed passive optical network (WDM PON) system according to an embodiment of the present invention, the central office may include a direct detection receiver receiving the optical polar RZ amplitude modulation signal transmitted from the optical network unit; an optical equalizer optically compensating the limited modulation bandwidth of the reflective semiconductor optical amplifier; and a signal processor processing the output of the optical equalizer.

With regard to the wavelength-division-multiplexed passive optical network (WDM PON) system according to an embodiment of the present invention, the signal processor may include a sampling part sampling the output of the optical equalizer; and an electrical equalizer applying an electrical equalization technique to the output of the sampling part for compensating the limited modulation bandwidth of the reflective semiconductor optical amplifier.

According to the method and apparatus for generating a polar RZ amplitude modulation signal using an RSOA according to an embodiment of the present invention, it is possible to overcome the problem of the conventional RSOA-based WDM PON structure that the transmission speed per channel with direct-detection receiver cannot be increased to 10 Gb/s or above due to the limited modulation bandwidth of RSOA. Also, the present invention has an effect of receiving the generated amplitude modulation signal through a direct detection receiver which is cost-effective and simple, and further has an effect of enabling ultrahigh speed operation of the RSOA-based WDM PON.

DETAILED DESCRIPTION

Reference will be now made in detail to the preferred embodiment of the present invention with reference to the attached drawings. The present invention is not restricted to the embodiments of the present invention but can be embodied in other various forms. The following embodiment of the present invention is provided in order to completely disclose the present invention and perfectly let those skilled in the art understand the contents and the scope of the invention, and hence, it will be understood by those of ordinary skill in the art that various changes in form and details may be made therein without departing from the spirit and scope of the present invention.

Figure 1:
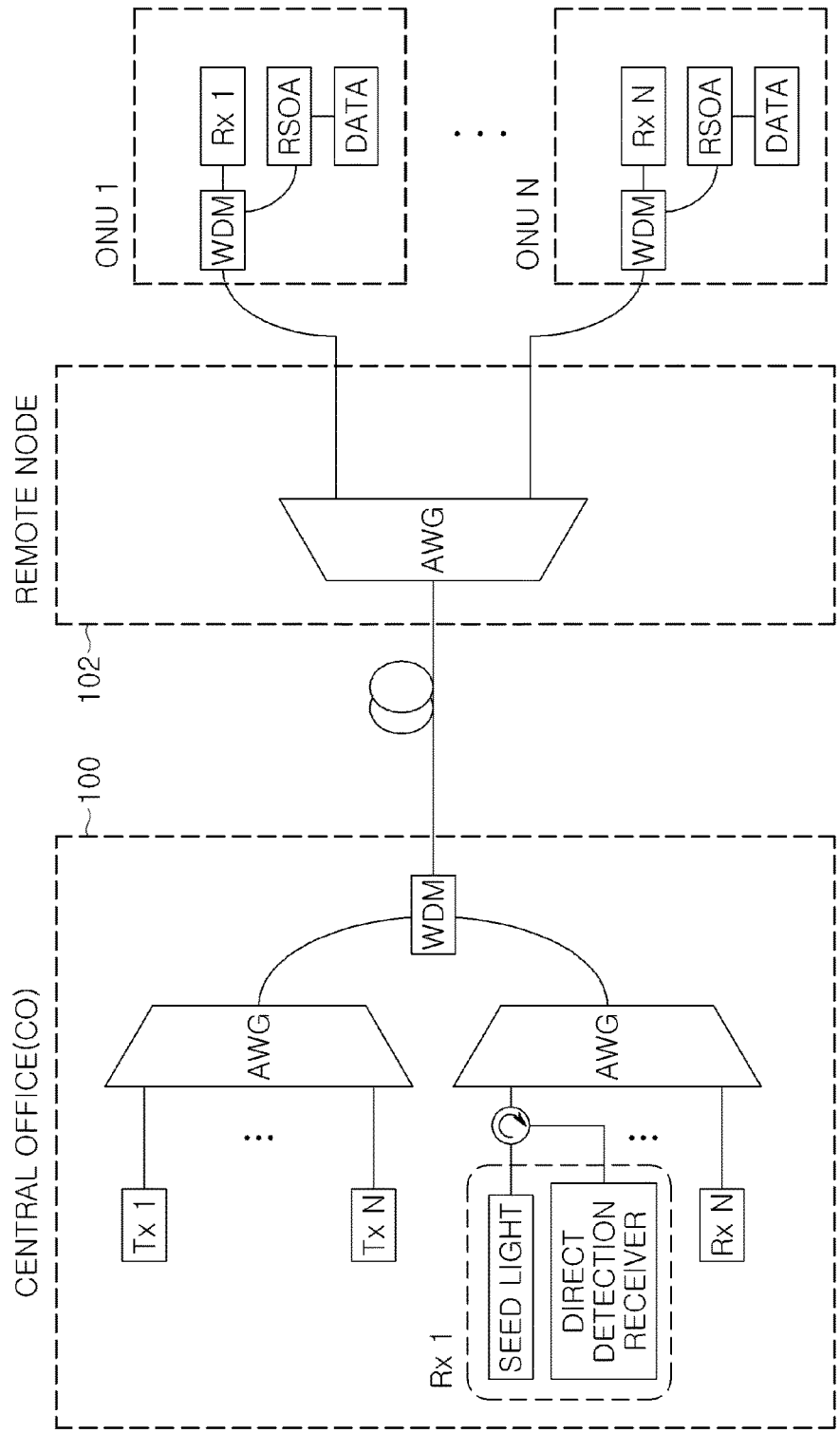
FIG. 1 is a drawing illustrating a general structure of an RSOA-based WDM PON.

FIG. 1 is a drawing illustrating a general structure of an RSOA-based WDM PON. A central office (CO) 100 transmits a seed light for RSOA using a continuous wave (cw) laser. This signal passes a fiber and a remote node 102, and enters the RSOA of an ONU, and the RSOA directly modulates the seed light based on a signal to form an upstream signal. This upstream signal is detected by receiver at the CO 100. In this case, a direct detection receiver is used as a receiver. However, the RSOA-based WDM PON using a direct detection receiver has a problem that the transmission speed per channel cannot be greatly increased because the modulation bandwidth of the RSOA is generally strictly limited to 3 GHz or below, and the sensitivity of the direct detection receiver is limited.

Figure 2:
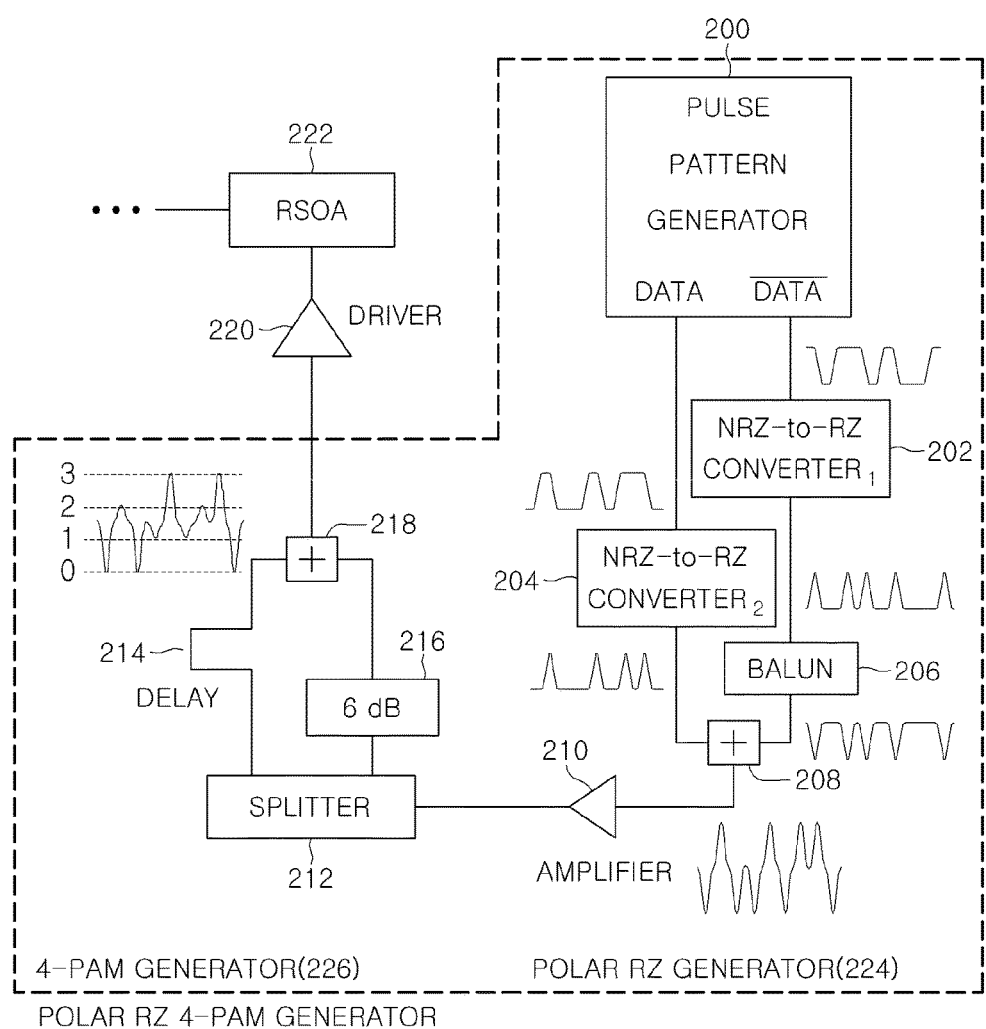
FIG. 2 is a drawing illustrating the structure of an apparatus for generating an optical polar RZ amplitude modulation signal according to an embodiment of the present invention.

FIG. 2 is a drawing illustrating the structure of an apparatus for generating an optical polar RZ amplitude modulation signal according to an embodiment of the present invention. That is, the drawing illustrates a process of generating a polar RZ electrical signal using an RSOA. In order to generate a polar RZ signal, first, an NRZ electrical signal and a complementary signal thereof are respectively converted into RZ signals using two NRZ-to-RZ converters 202 and 204 from a pulse pattern generator (PPG) 200. After reversing one RZ signal using a balun 206, a polar RZ signal is generated by combining it with the other RZ signal using a power combiner 208. In order to operate the RSOA at a higher modulation speed, the polar RZ signal generated as above may be converted into a multi-level amplitude modulation signal using a multi-level amplitude modulation signal generator such as a 4-PAM generator 226 illustrated in FIG. 2. As for the 4-PAM generator 226 illustrated in FIG. 2, the polar RZ electrical signal generated by the polar RZ signal generator 224 is split into two signals by a power splitter 212, one of the two split polar RZ signals is delayed by a delay line 214 and the other one is attenuated to 6 dB by an attenuator 216, and then they are combined again by a power combiner 218. A polar RZ 4-ary pulse amplitude modulation electrical signal may be generated through this process, and examples of the wave form generated in each process are illustrated together in FIG. 2. Then, an optical polar RZ amplitude modulation signal, which is an upstream signal, is generated by directly modulating a seed light based on the polar RZ electrical signal generated as above by RSOA 222.

Figure 3A:
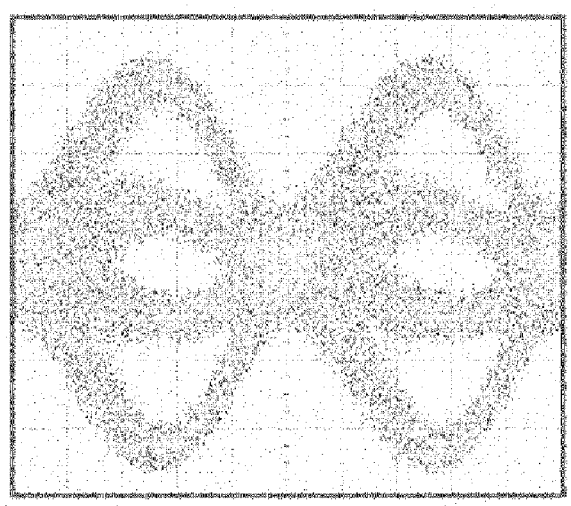
FIG. 3A is an eye diagram of a 20 Gb/s polar RZ 4-ary electrical signal generated through the polar RZ 4-ary signal generator experimentally measured in FIG. 2.
Figure 3B:
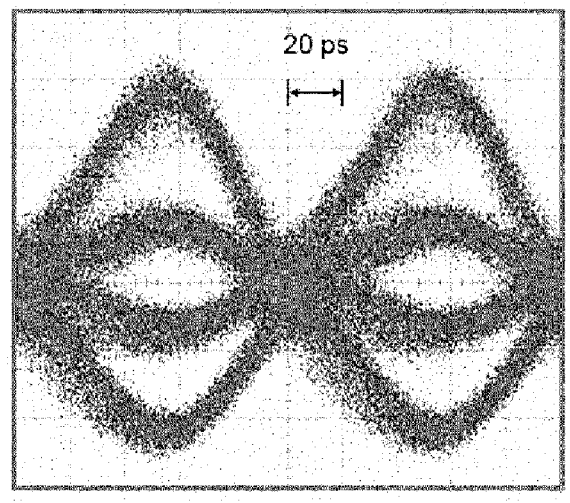
FIG. 3B is an eye diagram of a 20 Gb/s polar RZ 4-ary optical signal generated by directly modulating RSOA with the polar RZ 4-ary electrical signal experimentally measured in FIG. 3A.

FIG. 3A is an eye diagram of a 20 Gb/s polar RZ 4-ary electrical signal directly generated through the polar RZ 4-ary signal generator of FIG. 2. An upstream signal is generated by directly modulating the seed light by the RSOA located in an ONU based on the electrical signal generated as above, and as a result, an eye diagram of an optical signal may be obtained as shown in FIG. 3B.

Figure 4:
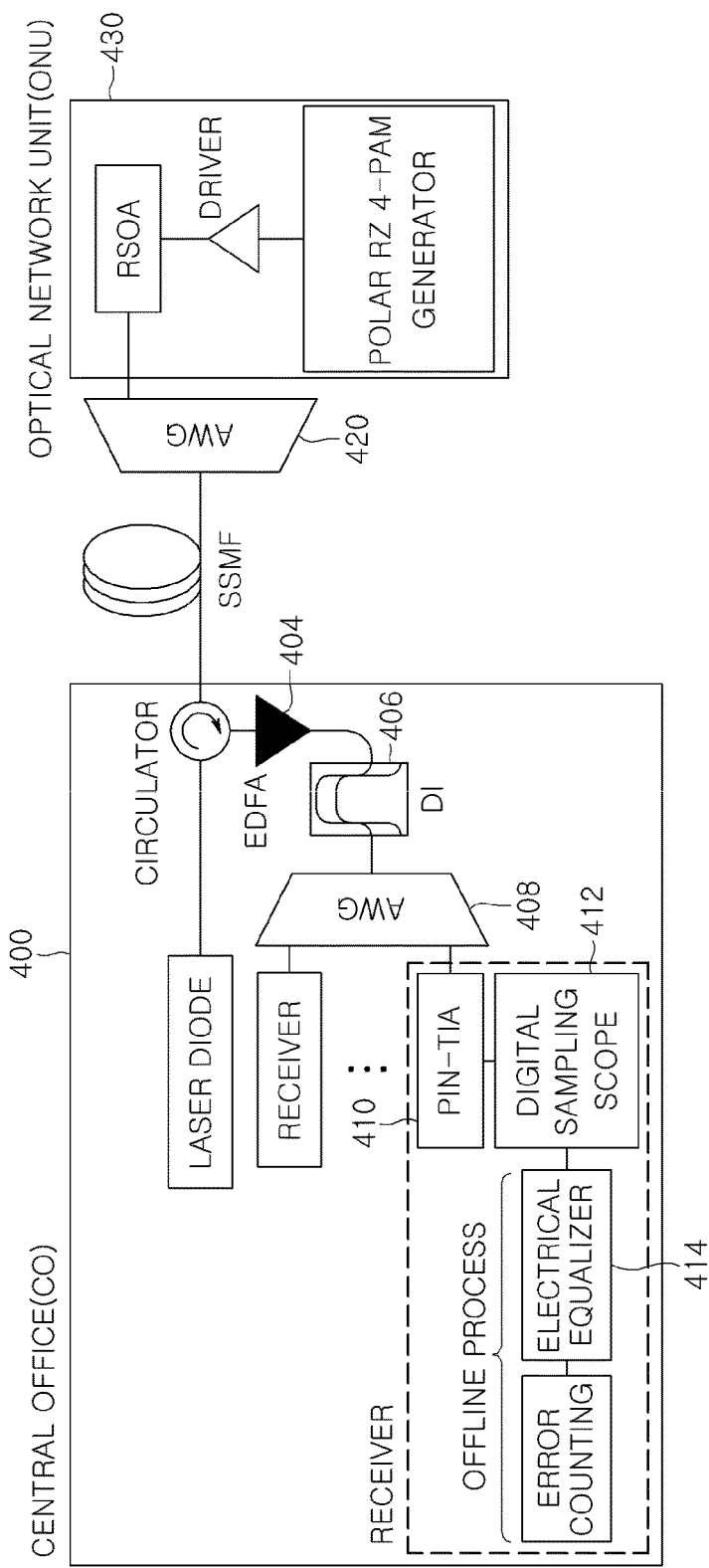
FIG. 4 is an experiment block diagram for transmitting a 20-Gb/s level high-speed upstream signal using the present invention in an RSOA-based WDM PON using a direct detection receiver as in FIG. 1.

FIG. 4 is an experiment block diagram for transmitting a 20-Gb/s level high-speed upstream signal using the present invention in an RSOA-based WDM PON as in FIG. 1. In order to transmit a high-speed signal, a 20-Gb/s polar RZ 4-ary signal is generated using an RSOA in the ONU 430. In this case, the modulation bandwidth of the RSOA used in the experiment is measured as 3.1 GHz. The optical power of the seed light injected to the RSOA located in the ONU 430 is set at −6 dBm. Also, an upstream signal is received using a direct detection receiver that is cost-effective and has a simple structure. In this case, the direct detection receiver used in CO 400 includes an optical amplifier (EDFA) 404 used to secure sufficient power budget as an optical pre-amplifying receiver, a delay interferometer (DI) 406 for optically equalizing the modulation bandwidth of the limited RSOA, an arrayed waveguide grating (AWG) 408 and a PIN detector 410. After sampling the signal directly detected and received at a speed of 80 G sample/s using a digital sampling oscilloscope 412, which is a signal processor, the bit error ratio thereof is measured by going through an electrical equalization process for compensating the limited modulation bandwidth of the RSOA.

Figure 5A:
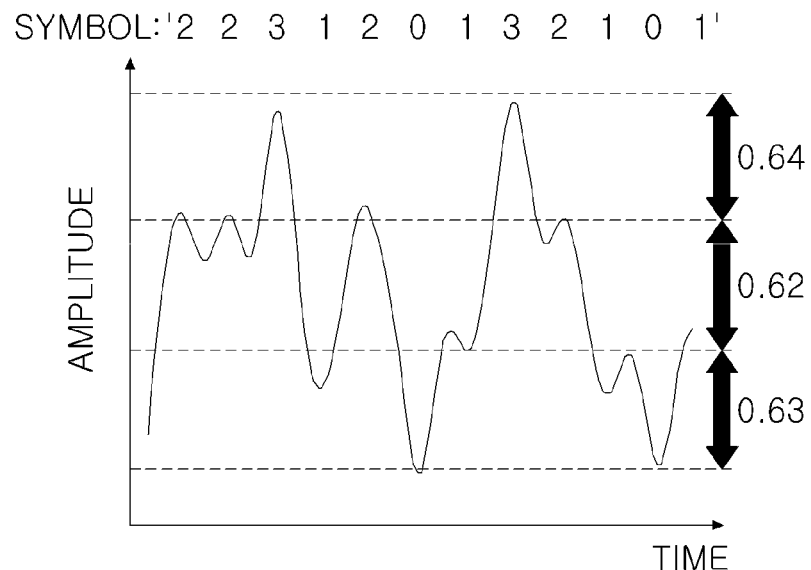
FIG. 5A is a wave form of a 20-Gb/s polar RZ 4-ary signal measured through a digital sampling scope in the experiment block diagram in FIG. 4.
Figure 5B:
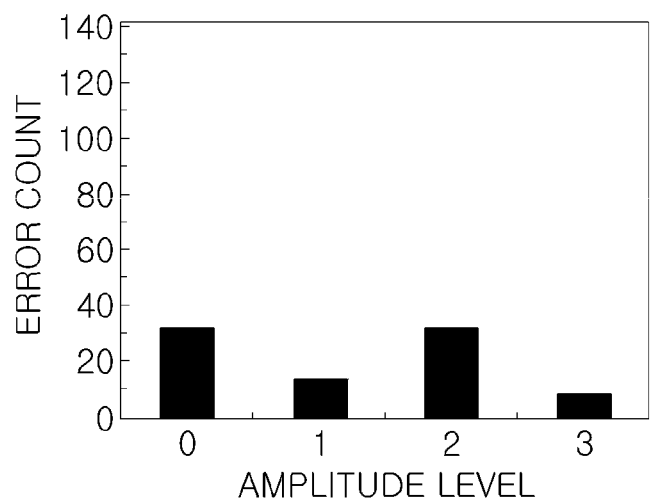
FIG. 5B is an error distribution chart calculating the error generated in each amplitude level of the 20-Gb/s polar RZ 4-ary signal measured.

In this case, the wave form of a 20-Gb/s polar RZ 4-ary signal sampled through a digital sampling oscilloscope before going through the electrical equalization process is as shown in FIG. 5A. When driving the RSOA whose modulation bandwidth is merely about 3 GHz at a speed of 20-Gb/s using the previously reported amplitude modulation signals, the WDM PON system could not be implemented because inter-symbol-interference (ISI) occurred severely by the limited modulation bandwidth, and many wave forms received through the receiver were distorted. However, as can be seen in FIG. 5A, it may be confirmed that when using a polar RZ 4-ary modulation signal, the wave form received was not greatly distorted even when the RSOA directly modulated the seed light based on the polar RZ 4-ary modulation signal to a speed of 20-Gb/s, and the difference between the four amplitude levels presented uniform properties. The level expressed in dotted lines in FIG. 5A represents the average value of each amplitude level of the received signal. Also, FIG. 5B illustrates the bit error ratio curve by directly calculating the number of bit errors occurring at each amplitude level using the received signal. It may be confirmed that the number of bit errors occurring at each of the four amplitude levels is uniformly distributed, and due to the uniform distribution of bit error, the transmission performance of the signal is not affected by a specific level of signal, and thus good transmission performance may be achieved.

Figure 6:
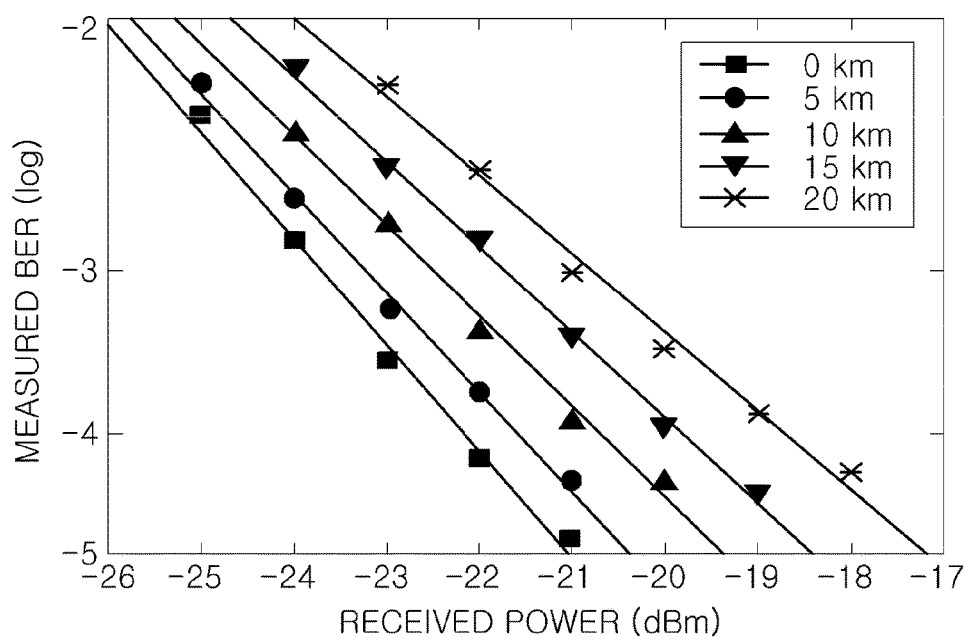
FIG. 6 is a bit error ratio curve of the 20-Gb/s polar RZ 4-ary signal measured.

FIG. 6 is a bit error ratio curve measured. The bit error ratio curve was measured varying the transmission distance from 0 km to 20 km every 5 km. According to the present invention, a 20-Gb/s level upstream signal may be transmitted using an RSOA whose bandwidth is merely 3.1 GHz in a WDM PON whose transmission distance is 20 km.

What is claimed is:

1. A method for generating an optical polar return-to-zero (RZ) amplitude modulation signal, the method comprising:
   generating an electrical polar RZ amplitude modulation signal using a polar RZ amplitude modulation signal generator; and
   generating the optical polar RZ amplitude modulation signal by applying the electrical polar RZ amplitude modulation signal to a reflective semiconductor optical amplifier,
   wherein the step of generating the electrical polar RZ amplitude modulation signal comprises:
      generating a polar RZ signal using a polar RZ signal generator; and
      generating the electrical polar RZ amplitude modulation signal by converting the polar RZ signal into a multi-level amplitude modulation signal using a multi-level amplitude modulation signal generator; and
   the step of generating the polar RZ signal using the polar RZ signal generator comprises:
      generating a non-return-to-zero (NRZ) electrical signal and a complementary signal of the NRZ electrical signal using a pulse pattern generator;
      converting the NRZ electrical signal and the complementary signal of the NRZ electrical signal into a first RZ signal and a second RZ signal using a first NRZ-to-RZ converter and a second NRZ-to-RZ converter;
      reversing the first RZ signal using a balun, and
      generating the polar RZ signal by combining the reversed first RZ signal and the second RZ signal using a first power combiner.

2. The method of claim 1, wherein the electrical polar RZ amplitude modulation signal and the optical polar RZ amplitude modulation signal are multi-level signals.

3. An apparatus for generating an optical polar RZ amplitude modulation signal, comprising:
   a polar RZ amplitude modulation signal generator generating an electrical polar RZ amplitude modulation signal; and
   a reflective semiconductor optical amplifier generating the optical polar RZ amplitude modulation signal based on the electrical polar RZ amplitude modulation signal,
   wherein the polar RZ amplitude modulation signal generator comprises:

a polar RZ signal generator generating a polar RZ signal and providing the polar RZ signal to the reflective semiconductor optical amplifier as the electrical polar RZ amplitude modulation signal, wherein the polar RZ signal generator comprises:

a pulse pattern generator generating an NRZ electrical signal and a complementary signal of the NRZ electrical signal;

a first NRZ-to-RZ converter and a second NRZ-to-RZ convertor converting the NRZ electrical signal and the complementary signal of the NRZ electrical signal into a first RZ signal and a second RZ signal;

a balun reversing the first RZ signal; and a first power combiner generating the polar RZ signal by combining the reversed first RZ signal and the second RZ signal.

4. The apparatus of claim 3, wherein the electrical polar RZ amplitude modulation signal and the optical polar RZ amplitude modulation signal are multi-level signals.

5. The apparatus of claim 3, wherein the polar RZ amplitude modulation signal generator further comprises:

a multi-level amplitude modulation signal generator generating the electrical polar RZ amplitude modulation signal by converting the polar RZ signal output from the polar RZ signal generator into a multi-level amplitude modulation signal.

6. A wavelength-division-multiplexed passive optical network (WDM PON) system, comprising:

a central office multiplexing and transmitting downstream optical signals having different wavelengths and receiving and demultiplexing upstream optical signals having different wavelengths;

at least one optical network unit; and a remote node receiving the downstream optical signals from the central office and transmitting them to each of said at least one optical network unit by demultiplexing them for each wavelength, and receiving and multiplexing the upstream optical signals having different wavelengths from said each optical network unit and transmitting them to the central office, wherein the optical network unit receives a downstream optical signal from the remote node and transmits an upstream optical signal to the remote node;

the optical network unit generates an optical polar RZ amplitude modulation signal as the upstream optical signal;

the optical network unit comprises:

a polar RZ amplitude modulation signal generator generating an electrical polar RZ amplitude modulation signal; and a reflective semiconductor optical amplifier generating the optical polar RZ amplitude modulation signal based on the electrical polar RZ amplitude modulation signal;

wherein the polar RZ amplitude modulation signal generator comprises:

a polar RZ signal generator generating a polar RZ signal and providing the polar RZ signal to the reflective semiconductor optical amplifier as the electrical polar RZ amplitude modulation signal, wherein the polar RZ signal generator comprises:

a pulse pattern generator generating an NRZ electrical signal and a complementary signal of the NRZ electrical signal;

a first NRZ-to-RZ converter and a second NRZ-to-RZ convertor converting the NRZ electrical signal and the complementary signal of the NRZ electrical signal into a first RZ signal and a second RZ signal;

a balun reversing the first RZ signal; and a first power combiner generating the polar RZ signal by combining the reversed first RZ signal and the second RZ signal.

7. The system of claim 6, wherein the electrical polar RZ amplitude modulation signal and the optical polar RZ amplitude modulation signal are multi-level signals.

8. The system of claim 6, wherein the polar RZ amplitude modulation signal generator further comprises:

a multi-level amplitude modulation signal generator generating the electrical polar RZ amplitude modulation signal by converting the polar RZ signal output from the polar RZ signal generator into a multi-level amplitude modulation signal.

9. The system of claim 6, wherein the central office comprises:

a direct detection receiver receiving the optical polar RZ amplitude modulation signal transmitted from the optical network unit;

an optical equalizer optically compensating a limited modulation bandwidth of the reflective semiconductor optical amplifier; and a signal processor processing the output of the optical equalizer.

10. The system of claim 9, wherein the signal processor comprises:

a sampling part sampling the output of the optical equalizer; and an electrical equalizer applying an electrical equalization technique to the output of the sampling part for compensating the limited modulation bandwidth of the reflective semiconductor optical amplifier.

\* \* \* \* \*